Sept. 17, 1935.　　　N. G. BAGULEY ET AL　　　2,014,998
APPARATUS FOR TESTING THE THICKNESS OF THREADS, WIRES, STRIPS AND THE LIKE
Filed Jan. 30, 1933　　　2 Sheets-Sheet 1
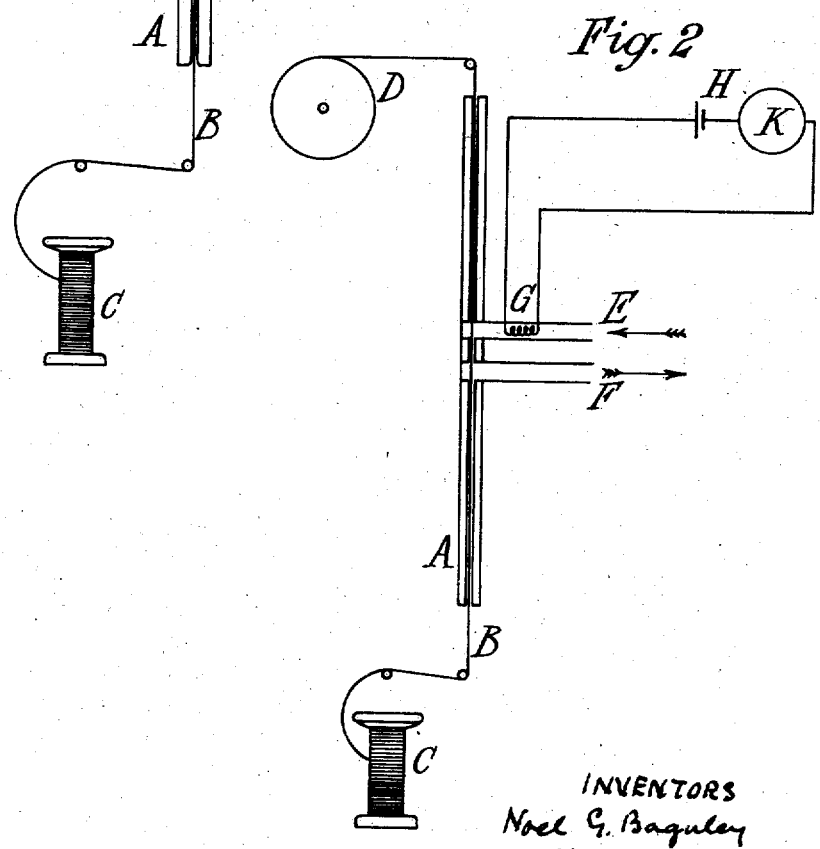

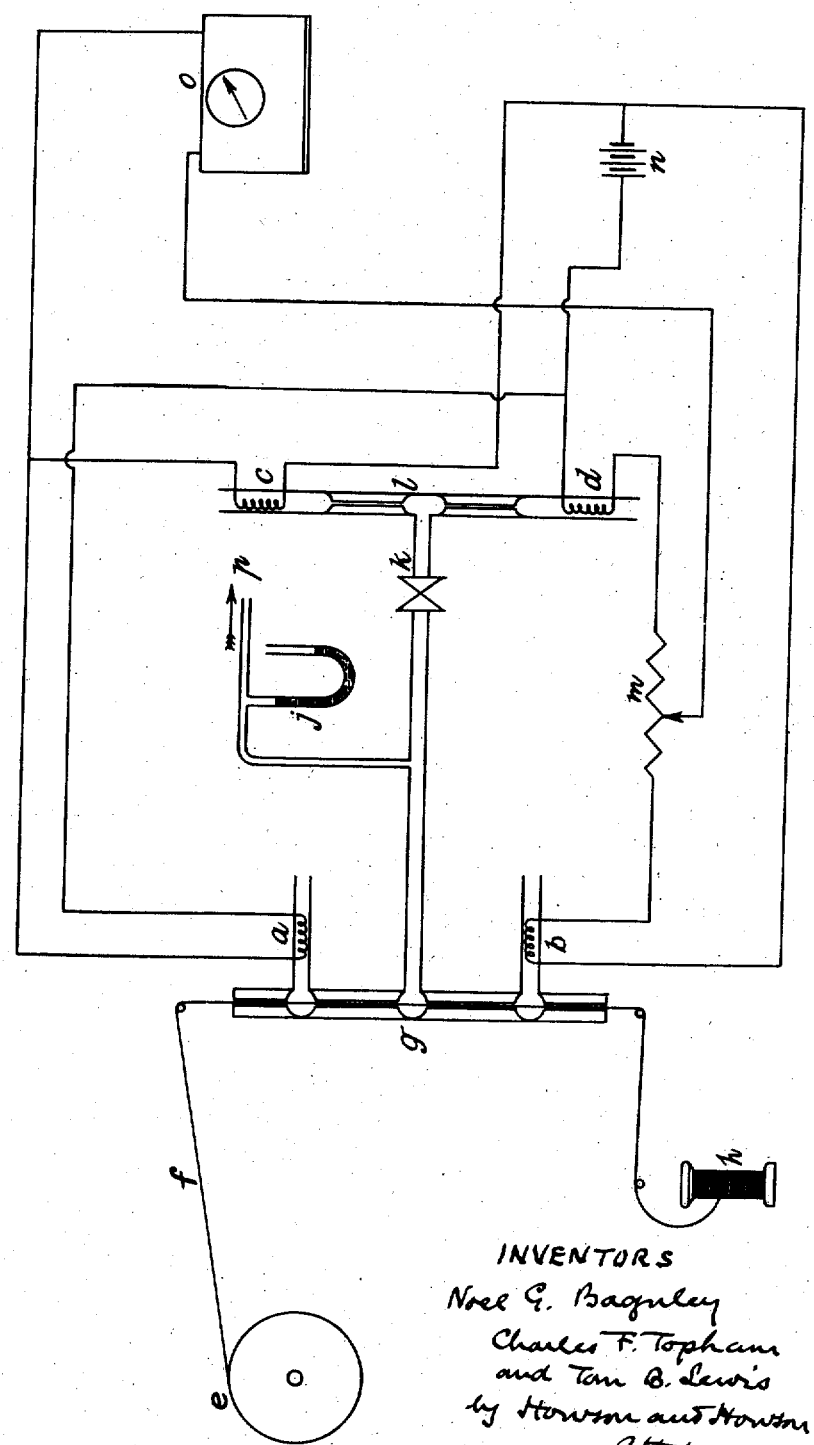

Patented Sept. 17, 1935

2,014,998

UNITED STATES PATENT OFFICE 2,014,998

APPARATUS FOR TESTING THE THICKNESS OF THREADS, WIRES, STRIPS, AND THE LIKE

Noel Gregory Baguley, Kenilworth, Charles Fred Topham, Earlsdon, Coventry, and Tom Bennett Lewis, Coventry, England, assignors to Courtaulds Limited, London, England, a British company Application January 30, 1933, Serial No. 654,294
In Great Britain February 27, 1932

4 Claims. (Cl. 33—125)

This invention relates to a new apparatus for examining the nature of variations in denier, count or thickness of a thread, which may be of silk, artificial silk, staple fibre, cotton, wool, worsted, strip, ribbon wire or the like.

If a thread be passed continuously through a comparatively narrow orifice such for instance as a capillary tube through which a current of air is passing at the same time, and if the thread varies in thickness, the flow of air will also vary, since when a thicker part of the thread passes through the tube, less space remains for the air to travel through the tube, and consequently the flow of the air will diminish, while on the contrary, when a thin part of the thread travels through the tube, the flow of air will increase. According to "Die Kunsteseide" 1931, page 281 et seq. this principle has been made use of in a method of testing variations in the denier of a thread, the pressure variations resulting from the variations in flow being measured by a differential manometer, while the thread is made to enter and leave, through mercury seals, the system in which the variations of pressure are measured.

When testing threads, wires, strips and the like (hereinafter referred to as the thread) with the apparatus according to the present invention, the thread is led through a narrow orifice, and at the same time a current of fluid at constant pressure is passed through the same orifice, and the said current of fluid is also caused to pass over an electrical resistance such as a wire or other element (hereinafter referred to as wire) heated by an electric current in a suitable chamber protected from outside temperature change, while the variations in the temperature or resistance of the said wire are measured by any suitable means. The orifice may, for example, be in the form of a die or a capillary tube and is hereinafter referred to as a capillary tube. The fluid may conveniently be (and is hereinafter referred to as) air, and may travel in the same direction as, or in the opposite direction to, the thread. Means consisting of a capillary system free from any sealing liquid are employed as hereinafter set forth being so disposed as to cause the said current of fluid to traverse the said narrow orifice. The changes in the rate of flow of the air cause variations in the cooling effect of the air on the heated wire, the electrical resistance of which alters correspondingly. It will thus be seen that the resistance of the heated wire bears a relation to the thickness of the thread, and by observing the variations in the temperature or resistance of the heated wire, valuable information regarding the variation in the thickness of the thread can be obtained. It will be understood that any known method of indicating temperature changes in or around the wire may be used, for example the electrical resistance may be measured directly or a thermo-electric junction element may be included as part of the wire, or placed in close proximity to the said wire.

We generally prefer to make use of the heated wire in the form of a coil and to record the temperature variations of the heated coil automatically on any suitable recording device.

We also prefer to employ a plurality of wires divided into two sets, each set consisting of one or more wires. The flow of air past all the wires is caused by the same source of pressure or suction. The wires of one set are subjected to the flow of the current of air on which variations are imposed by the varying thickness of a thread, while in the other set, the current of air flowing past the wires is not subjected to such variations. For example according to our invention we can conveniently provide two wires in each set and arrange these four wires as the four arms of a Wheatstone bridge circuit. If use be made of a recording galvanometer, the current passing through this galvanometer will bear a direct relation to the thickness of the thread practically independent of any fluctuations in the source of pressure or suction.

The invention will be further described with reference to the accompanying drawings which illustrate diagrammatically methods of carrying out our invention; Figure 1 illustrates the principle upon which the invention is based, Figure 2 illustrates a simple method of carrying out the invention, and Figure 3 a more elaborate method allowing of greater accuracy than the method illustrated in Figure 2.

Referring to Figure 1, A represents a capillary tube through which a thread B passes as it is drawn from a bobbin C and collected on a winding bobbin D. A broader tube E leads into the capillary tube A at about its centre. A coil G of suitable wire is arranged in the said tube E and is in circuit with a source of current H and a galvanometer K. When employing this simplest form of our invention, suction is applied at E the source of suction being as constant as possible. Variations in the thickness of the thread B passing through the capillary tube A cause variations in current of air flowing through E and variations in the cooling effect and consequently in the resistance of the coil G; the variations in current thus produced can be detected on the galvanometer K. The form of apparatus illustrated in Figure 1 is shown merely to show clearly the principle of our invention; in practice we prefer the more accurate forms illustrated in Figures 2 and 3.

Referring to Figure 2, A represents a capillary tube through which passes the thread B as it is drawn from the bobbin C and collected on the winding bobbin D. Two broader tubes E and F lead into the capillary tube at two such points along its length, that the length of capillary tube between E and F is short in comparison with the two other parts of the capillary tube. In the tube E is arranged a coil G of suitable wire, forming a resistance through which a current is passed by means of an accumulator H, while in the same circuit is arranged a galvanometer K. The tube F is connected to a source of suction, care being taken to keep this suction as constant as possible. The suction draws air in through the tube E, over the coil G, through the centre part of the capillary tube A, and out through the tube F, and the quantity of air passing will vary according to the denier of the thread B which is passing through the capillary, being smaller as the thread is larger in diameter and vice versa. The variations of flow in the air will produce different cooling effects on the coil G and consequent variations in the current passing through the spiral, which variations of current can be detected on the galvanometer K.

Figure 3 illustrates a more elaborate and sensitive method of working according to this invention, in which use is made of four coils a, b, c and d of suitable wire arranged as the four arms of a Wheatstone bridge circuit. Preferably use is made of a wire having a high temperature coefficient of resistance. g represents the capillary tube through which the thread f passes on its way from the bobbin h to the bobbin e. The coils a and b are situated in broader tubes leading into the capillary g. The coils c and d are situated in similar positions with regard to another capillary l, while the centres of the two capillaries g and l are joined together by a tube from which air is drawn away by a branch tube p. j represents a manometer for conveniently observing the degree of suction in the tube p. k represents a micrometer valve and m a variable resistance by the adjustment of which a state of balance is reached in the Wheatstone bridge circuit. This adjustment should be made initially with a standard thread in the capillary, the said standard thread being of approximately the same thickness as the thread to be tested. n is an accumulator and o a galvanometer for recording the variation in current. By employing the four coils in the manner described, any fluctuations which may occasionally occur in the source of suction, will cause practically an equal change in temperature in all four coils, so that the current flowing through the galvanometer is practically unaffected by any fluctuations in the source of suction.

It will be understood that we may use either pressure or suction to produce the flow of fluid through the capillary.

It will be noted in each of the Figures 2 and 3 that the thread passes through an additional piece of capillary tubing at each end of the capillary in which the flow of air is being tested. These additional capillary tubes form means by which the thread can be led into and out from the measuring capillary tube without deleteriously affecting the flow of air in the said measuring capillary tube. The rise of these additional lengths of capillary tube offers advantages over the mercury seals which have hitherto been proposed.

Referring to the apparatus represented diagrammatically in Figure 3, when a thicker part of the thread enters the capillary tube between b and g, the flow of air through that capillary tube will be diminished and less air will pass over the resistance coil b, with the result that both its temperature and resistance will increase. This will alter the balance of the Wheatstone circuit and the needle of the galvanometer o will move in one direction. When the thick part of the thread passes g, the flow of air through the capillary tube between a and g will be diminished and the temperature of the resistance of the coil a will increase. Since the resistance coils a and b are in opposite arms of the Wheatstone circuit, an increase of resistance either in a or b will tend to move the galvanometer needle in the same direction, and if the resistances of both the coils a and b increase simultaneously, the effect on the galvanometer will be cumulative. With a capillary tube of internal diameter 0.015 inch and a thread of rayon of 72 denier and 14 filaments, the thread can conveniently be passed through the capillary tube at a speed of 20 meters per minute, while with a thread of greater denier, a slower speed is convenient. The lengths of capillary tube between a and g and between b and g can each be 1 cm. or less. The apparatus is then particularly useful in ascertaining whether there is any marked irregularity due to uneven delivery by the pump which supplies the spinning solution, to the spinning nozzle; such irregularities extend however, over a comparatively long length of yarn, say several meters. If the thread being tested has only short irregularities, then an apparatus of the type disclosed in Fig. 2 can be employed, and the length of the testing capillary between E and F can be chosen as short as desirable, that is to say, short in comparison with the irregularity; for instance, the capillary part can be less than 1 mm. in length.

What we claim is:—

1. Apparatus for testing the regularity of a thread comprising a comparatively narrow orifice, means for passing both the thread and a current of fluid simultaneously through the said orifice and comprising a capillary system containing gaseous matter but free from any sealing liquid, and so disposed as to cause the said current of fluid to traverse the said narrow orifice, means for passing the said current of fluid over an electrical resistance, through which a current of electricity is passing, and means for measuring the variations in the electrical conditions obtaining in the said electrical resistance.

2. Apparatus for testing the regularity of a thread comprising a capillary tube, means for passing both the thread and a current of fluid simultaneously through the said tube and comprising a capillary system containing gaseous matter but free from any sealing liquid, and so disposed as to cause the said current of fluid to traverse the said capillary tube, means for passing the said current of fluid over an electrical resistance, through which a current of electricity is passing, and means for measuring the variation in the electrical conditions obtaining in the said electrical resistance.

3. Apparatus for testing the regularity of a thread comprising a pair of comparatively narrow orifices in tandem, means for passing both the thread and respective branches of a current of fluid simultaneously through the said orifices and each comprising a capillary system containing gaseous matter but free from any sealing liquid, and so disposed as to cause the said respective branch currents of fluid to traverse the said narrow orifices, means for passing the said branch currents of fluid respectively over electrical resistances, through which currents of electricity are passing, and means for measuring the cumulative variations in the electrical conditions obtaining in its said electrical resistances.

4. Apparatus for testing the regularity of a thread comprising a capillary tube, means for passing both the thread and a current of fluid simultaneously through the said tube and comprising a capillary system containing gaseous matter but free of any sealing liquid, and so disposed as to cause the said current of fluid to traverse the said capillary tube in two branches and in opposite directions, means for passing each of the said branch currents of fluid over respective electrical resistances, through which respective currents of electricity are passing, and means for measuring the cumulative variation in the electrical conditions obtaining in the said electrical resistances.

NOEL GREGORY BAGULEY.
CHARLES FRED TOPHAM.
TOM BENNETT LEWIS.

CERTIFICATE OF CORRECTION.

Patent No. 2,014,998.   September 17, 1935.

NOEL GREGORY BAGULEY, ET AL.

It is hereby certified that error appears in the printed specification of the above numbered patent requiring correction as follows: Page 2, second column, line 2, for "rise" read use; and that the said Letters Patent should be read with this correction therein that the same may conform to the record of the case in the Patent Office.

Signed and sealed this 8th day of October, A. D. 1935.

(Seal)
Leslie Frazer
Acting Commissioner of Patents.

the thread and respective branches of a current of fluid simultaneously through the said orifices and each comprising a capillary system containing gaseous matter but free from any sealing liquid, and so disposed as to cause the said respective branch currents of fluid to traverse the said narrow orifices, means for passing the said branch currents of fluid respectively over electrical resistances, through which currents of electricity are passing, and means for measuring the cumulative variations in the electrical conditions obtaining in its said electrical resistances.

4. Apparatus for testing the regularity of a thread comprising a capillary tube, means for passing both the thread and a current of fluid simultaneously through the said tube and comprising a capillary system containing gaseous matter but free of any sealing liquid, and so disposed as to cause the said current of fluid to traverse the said capillary tube in two branches and in opposite directions, means for passing each of the said branch currents of fluid over respective electrical resistances, through which respective currents of electricity are passing, and means for measuring the cumulative variation in the electrical conditions obtaining in the said electrical resistances.

NOEL GREGORY BAGULEY.
CHARLES FRED TOPHAM.
TOM BENNETT LEWIS.

CERTIFICATE OF CORRECTION.

Patent No. 2,014,998.  September 17, 1935.

NOEL GREGORY BAGULEY, ET AL.

It is hereby certified that error appears in the printed specification of the above numbered patent requiring correction as follows: Page 2, second column, line 2, for "rise" read use; and that the said Letters Patent should be read with this correction therein that the same may conform to the record of the case in the Patent Office.

Signed and sealed this 8th day of October, A. D. 1935.

(Seal)
Leslie Frazer
Acting Commissioner of Patents.